Figure 1:
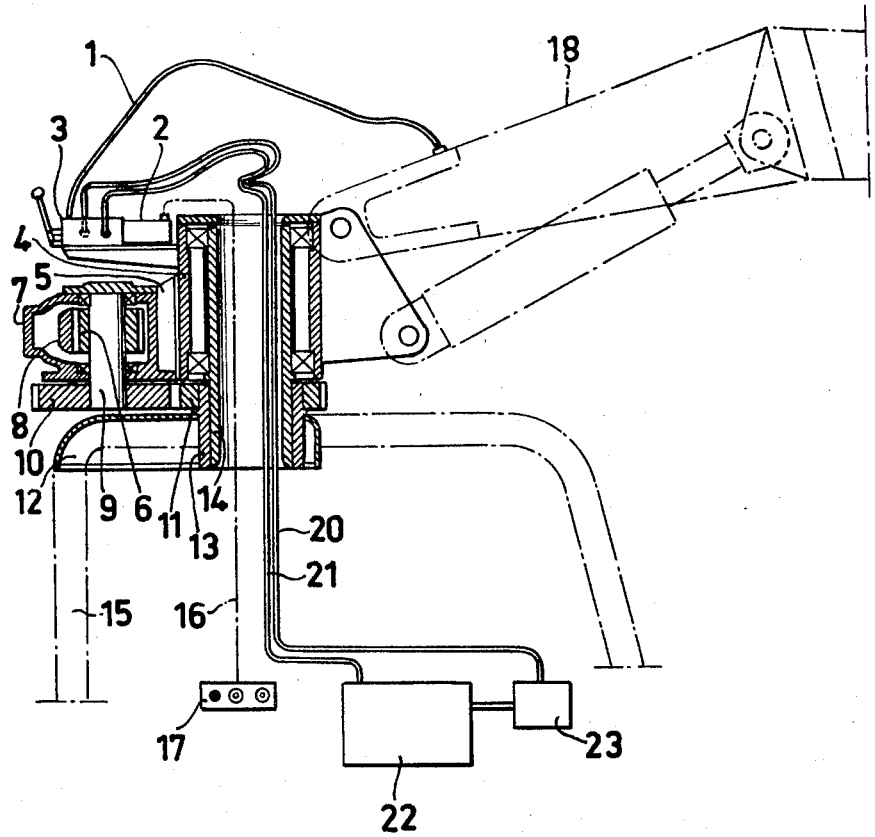

Aug. 9, 1966     B. H. KARLIN     3,265,221
ELECTRICALLY CONTROLLED AND HYDRAULICALLY OPERATED
SWIVEL MANTLE, PARTICULARLY FOR GRAB LOADERS
Filed March 4, 1964     2 Sheets-Sheet 1

Inventor
Bengt Haldo Karlin
by Sommers & Young
Attorneys

# United States Patent Office 3,265,221
Patented August 9, 1966

3,265,221
ELECTRICALLY CONTROLLED AND HYDRAULICALLY OPERATED SWIVEL MANTEL, PARTICULARLY FOR GRAB LOADERS
Bengt Haldo Karlin, Alfta, Sweden, assignor to Östbergs Fabriks AB, Alfta, Sweden, a joint-stock company of Sweden
Filed Mar. 4, 1964, Ser. No. 349,417
Claims priority, application Sweden, Mar. 5, 1963, 2,395/63
3 Claims. (Cl. 212—68)

This invention relates to a revolving arrangement, for example for use in grab loaders, with considerable rotary force, reliable hydraulic equipment and provided with remote control to give the driver freedom of choice with respect to his place during operation.

Conventional constructions for similar work include the disadvantages of being equipped with fixed hand-operated hydraulic valves placed, for example, in the driver's cab, thus requiring the driver to stay very near said valves for operating them. There is further the disadvantage that, in the case of many double-acting hydraulic cylinders located above each other or on the same level with the swivel tower, at least two hydraulic lines per hydraulic cylinder must be drawn from the said hand-operated hydraulic valves up to the hydraulic cylinders.

The said hydraulic lines must be capable of taking up a rotary motion of the swivel tower of about 360 degrees and were previously mounted in wide coils about the swivel tower or by way of swivels through the center of the swivel tower. In the first-mentioned case, there arise considerable costs due to the wear of the hoses usually provided in a number of eight to ten, while in the latter case the disadvantages most obviously are found in leaks easily occurring in the swivels as a result of wear and deformations and when a plurality of hoses combined to bundles are to be bent.

Furthermore, in both of the aforesaid solutions of the hydraulic system, the great number of long lines arranged in the driver's cab constitute a hindrance and involve obvious shortcomings.

The present invention eliminates the aforesaid disadvantages in that an electric remote-control of a battery of hydraulic valves disposed on the same level as the swivel post renders it possible that only two hydraulic lines (feed line and return line) have to pass to and from the swivel post. The said two lines run through a hole in the center of the swivel post and take up the rotary motion of the swivel post by way of an eye of special shape attached to each hydraulic hose. In parallel with the hydraulic lines in the center of the swivel post runs an electric cable from the electrically operated hydraulic valves at the swivel post down to a control panel located, for example, at the driver's place, thus rendering possible operation within a radius of action which is determined by the length of the said electric cable. The driver, thus, is not bound to stay on the tractor for operation.

Figure 2:
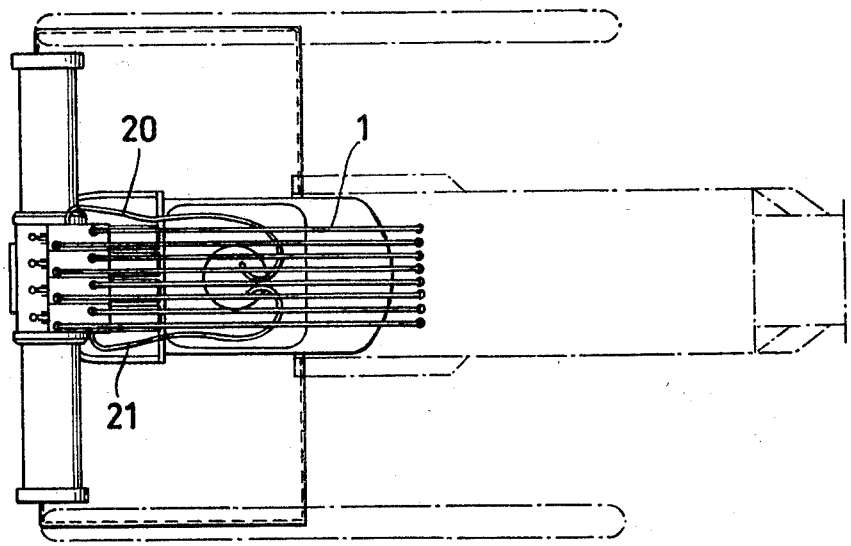

The invention will be described in greater detail in the following, reference being had to the accompanying drawings, wherein FIG. 1 shows a vertical section through an arrangement according to the invention, and
FIG. 2 shows a view of the hydraulic line system.

A top bridge 12 which constitutes the immediate support for the actuating mechanism is rigidly secured to a protective frame 15. A center upright swivel post 14 is rigidly connected with the top bridge 12 by way of a support sleeve 13. On the center upright post 14 a swivel mantle 4 is mounted to rotate thereon. A rotary gear housing 7 effects rotary motion of the axle journal 9 by way of a cog wheel 6 which is caused to rotate by a hydraulically operated rack 8. The gear 10 is fixedly connected with the axle journal 9 and is provided with teeth which mesh with the gear ring 11 which in its turn is fixedly connected with the support sleeve 13. Upon rotating, the cog wheel 10 travels about the gear ring 11 and, thus, forces the swivel mantle 4 to participate in said rotation, because the rotary housing 7 is rigidly connected with the swivel mantle 4 by way of the bracket 5. Hereby the grab loader arm 18 which is vertically rotatably anchored at the swivel mantle, is caused to carry out a horizontal rotary movement.

In the upper portion of the swivel mantle 4 a battery of hydraulic valves 3 is mounted, to which battery a hydraulic feed line 20 is drawn from a hydraulic pump 23. From the said battery of hydraulic valves 3 a hydraulic return line 21 runs down to a hydraulic oil tank 22 which in its turn delivers oil to the hydraulic pump 23. The said hydraulic valves 3 are actuated by solenoids 2 which in their turn are operated from an electric control panel 17 by way of an electric cable 16. From the hydraulic valves 3 the hydraulic cylinders are divided by a number of hydraulic lines 1.

What I claim is:
1. An electrically controlled, hydraulically operated revolving arrangement, particularly for use in grab loaders, comprising an upright swivel post having a gear ring fixed thereto and extending thereabout, a swivel mantle rotatably mounted on said post, a gear housing fixedly connected with said swivel mantle, an axle journal mounted in said gear housing, a first cog wheel fixed on said axle journal, a hydraulically actuated rack engaging said first cog wheel, a second cog wheel provided on said axle journal and meshing with said gear ring on said swivel post, to swing said housing and mantle about said upright swivel post upon actuation of said rack and a boom pivotally mounted on said mantle to be swung thereby.

2. A revolving arrangement according to claim 1, and in which said post is provided with an axially extending passageway, an hydraulic pump having hydraulic valves, an hydraulic feed line extending through said passageway connecting said pump with said hydraulic valves, an hydraulic oil tank, and an hydraulic return conduit connected with said tank and extending through said passageway.

3. A revolving arrangement according to claim 2, and in which both said feed line and said return conduit are arranged in loops above said swivel mantle, whereby said swivel mantle can be rotated angularly about 200 degrees to each side without exposing said line and conduit to fatiguing torsional stress.

References Cited by the Examiner
UNITED STATES PATENTS

| 1,855,892 | 4/1932 | Schiebeler | 212—69 |
| 2,466,619 | 4/1949 | Stuckey et al. | 212—69 |
| 2,761,569 | 9/1956 | Iserman | 212—38 |
| 2,959,260 | 11/1960 | Johnson et al. | 212—38 X |
| 3,037,642 | 6/1962 | Pohl | 212—69 |

HUGO O. SCHULZ, Primary Examiner.